US008958561B2

(12) United States Patent
Stroud

(10) Patent No.: US 8,958,561 B2
(45) Date of Patent: Feb. 17, 2015

(54) SYSTEMS AND METHODS FOR MULTI LAYER DELIVERY OF INFORMATION

(75) Inventor: Ken A. Stroud, Greenville, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 323 days.

(21) Appl. No.: 13/495,750

(22) Filed: Jun. 13, 2012

(65) Prior Publication Data

US 2013/0022202 A1 Jan. 24, 2013

Related U.S. Application Data

(60) Provisional application No. 61/509,415, filed on Jul. 19, 2011.

(51) Int. Cl.
 *H04W 12/02* (2009.01)
 *H04L 29/06* (2006.01)
(52) U.S. Cl.
 CPC ............ *H04L 63/302* (2013.01); *H04W 12/02* (2013.01)
 USPC ........................................ 380/270
(58) Field of Classification Search
 CPC .................................... H04W 12/02
 USPC ......................... 380/270; 726/26
 See application file for complete search history.

(56) References Cited

U.S. PATENT DOCUMENTS

| 8,220,038 | B1 * | 7/2012 | Lucchesi et al. ................ 726/9 |
| 2006/0137018 | A1 * | 6/2006 | Herschaft ...................... 726/26 |
| 2006/0183474 | A1 * | 8/2006 | Ziarno et al. .................. 455/431 |
| 2009/0322874 | A1 * | 12/2009 | Knutson et al. ............... 348/143 |
| 2010/0280904 | A1 * | 11/2010 | Ahuja ......................... 705/14.58 |

OTHER PUBLICATIONS

Global Security, "Common Data Link", Apr. 26, 2005, 7 pgs.
Kenyon, "Video Streams to the Tip of the Spear", Signal Online, Printed From Internet Dec. 31, 2010, 4 pgs.
Baddeley, "Walking Antenna", Special Operations Technology, Printed From Internet Dec. 31, 2010, 10 pgs.
L3 Communications, "Rover 5 Handheld", Apr. 15, 2008, 2 gps.
L3 Communications, "Rover 4 Receiver", Aug. 27, 2007, 2 pgs.
L3 Communications, "Rover III Receiver", Sep. 21, 2006, 2 pgs.
L3 Communications, "mRover Video Transceiver", 2008, 4 pgs.
L3 Communications, "Rover 5 Handheld" Jul. 15, 2010, 2pgs.
Harris, AN/PRC-117F(C) Multiband Multimission Radio, Applicants Handbook 2007, 32 pgs.

* cited by examiner

*Primary Examiner* — Teshome Hailu
*Assistant Examiner* — Thanh Le
(74) *Attorney, Agent, or Firm* — Egan, Peterman & Enders LLP.

(57) ABSTRACT

Systems and methods that may be implemented to provide digital data from a remote information source to multiple local user devices using a multi-layer communication path and a local wireless server node. The multi-layer communication path may, for example, include a relatively long range secure first layer wireless communications path from the remote information source to a local wireless server node, and relatively short range second layer wireless communications path from the local wireless server node to one or more local user devices.

38 Claims, 4 Drawing Sheets

SYSTEMS AND METHODS FOR MULTI LAYER DELIVERY OF INFORMATION

This application claims the benefit of U.S. Provisional Patent Application No. 61/509,415, filed on Jul. 19, 2011 and entitled "Systems and Methods for Multi Layer Delivery of Information", which is hereby incorporated herein by reference in its entirety for all purposes.

FIELD OF THE INVENTION

This invention relates generally to information delivery, and more delivery of information using multiple layers.

BACKGROUND OF THE INVENTION

Military-specific secure systems exist for beaming encoded or encrypted full motion video (FMV) data feeds from unmanned aerial vehicles (UAVs) directly by a single communication link to specially designed and configured military-specific laptop or handheld secure communication devices. The UAV images are then viewed on the screen of the device. Some of these military-specific secure communication devices are also capable of transmitting data back to the UAV or to other similarly configured secure military-specific communication devices that are in line of sight or very close proximity. Communications between the UAVs and the secure communication devices are typically encoded or encrypted in a way to prevent access by the general population, and the military-specific frequencies used to downlink FMV are generally not directly accessible by commercial devices.

SUMMARY OF THE INVENTION

Disclosed herein are systems and methods that may be implemented to provide digital data (e.g., such as sensor data, snapshot photo image data, streaming or otherwise moving video data, meta data associated with snapshot image or moving video, etc.) from a remote information source (e.g., such as an airborne UAV) to multiple local user devices using a multi-layer communication path and a local wireless server node. The multi-layer communication path may, for example, include a relatively long range secure first layer wireless communications path from the remote information source indirectly or directly to a local wireless server node, and a relatively short range second layer wireless communications path from the local wireless server node to one or more local user devices. Using this architecture, the disclosed systems and methods may be implemented to provide near real time images (e.g., snapshot or moving images) of areas of interest to be simultaneously distributed to many (e.g., thousands) of local users. The local wireless server node may also be configured to route communications (e.g. data, commands, messages, etc.) between the local user devices via the second layer wireless communications paths between the server node and the individual user devices, and/or from the local user devices to a remote information source via the first layer wireless communications path.

In one embodiment, a secure first layer wireless communications path may be a relatively long range broadcast and secure wireless data link (e.g., such as a tactical common data link, common data link, situation awareness data link, satellite communications data link, surveillance and control data link, etc.) that is capable of being simultaneously received and decrypted by multiple local receivers, e.g., as broadcast from an aircraft using a non-directional antenna. The local receivers receiving the secure first layer communications path may include local wireless server nodes that have wireless server components integrated with transceiver circuitry for communicating across the secure first layer communications path, or may alternatively include any suitable integrated or non-integrated combination of receiver, transmitter, transceiver and/or wireless server components that are operatively coupled together to perform the same or similar tasks.

The first layer wireless communications path may be operated to securely convey encrypted broadcast digital data (e.g., sensor data, photos or video image data with associated meta data) transmitted from the remote information source that is received and decrypted by each of any number of local receivers (including multiple local wireless server nodes) without the need for handshake signals from any of the local receivers. Examples of encryption types that may be employed for a secure first layer wireless communications path include, but are not limited to, encryption types implemented by secure hardware that is controlled, e.g., such as encryption types implemented using National Security Agency (NSA) Type 1, Type 2 and/or Type 3 hardware products. However, it will be understood that other types of NSA Types 1, 2 or 3 encryption types may be employed for a secure first layer wireless communications path, including software-implemented encryption that does not require controlled hardware.

It will be understood that in one exemplary embodiment, only NSA Type 1 hardware products and algorithms may be employed to implement a secure first layer wireless communications path. In another exemplary embodiment, only NSA Type 2 (or alternatively NSA Type 1 and Type 2) hardware products and algorithms may be employed to implement a secure first layer wireless communications path. In another exemplary embodiment, only NSA Type 3 (or alternatively NSA Type 1, Type 2 and/or Type 3) hardware products and algorithms may be employed to implement a secure first layer wireless communications path.

Examples of secure NAS-approved Type 1 encryption algorithms include published Advanced Encryption Standard (AES) and Skipjack algorithms. Examples of secure NAS-approved Type 2 encryption algorithms include CORDOBA. Examples of secure NAS-approved Type 3 encryption algorithms include Data Encryption Standard (DES) and Triple DES. NSA type 1, 2 and 3 encryption products and algorithms may employ any Type 1, 2 or 3 key and/or equipment, assembly or component that is certified by NSA for Type 1, 2 or 3 purposes. Other examples of secure encryption algorithms include Blowfish and Twofish. In one embodiment, a secure first layer wireless communications path may be characterized as employing algorithm and/or hardware encryption technology that does not utilize commercial off the shelf (COTS) technology to implement, and/or which is not decryptable using COTS data encryption techniques and/or COTS communication equipment that employs COTS data encryption techniques. Examples of such COTS data encryption techniques include Wi-Fi Protected Access ("WPA" and "WPA2") techniques, Wired Equivalent Privacy ("WEP") techniques, etc.

In one embodiment, at least one local wireless server node may be provided that includes a local receiver or transceiver for receiving data signals from the first layer communication path, and a local network server that stores the data received from the first layer communication path in decrypted form, or that alternatively may store the received data in a secure form for later decryption prior to further transmission. The local wireless server node may also be configured with a transmitter or transceiver to provide the decrypted data via either a secure or non-secure second layer wireless communications path to one or more other local user devices within a finite limited wireless local area network (WLAN) area or "data link bubble" so as to make the data contents of the local network server available to only those one or more user devices that are present within the confines of the data link bubble around the local wireless server node. In this embodiment, the data link bubble is defined by the outer wireless communication range of the WLAN communication technology employed by the local wireless server node for the second layer wireless communications path, which may have a much shorter range than the range of the wireless technology employed for the first layer communication path so that the first layer communication path is transmitted to areas beyond and outside the data link bubble defined by the second layer wireless communications path.

In one embodiment, a WLAN may be implemented for the short range second layer wireless communications path, for example, using a conventional commercial off the shelf (COTS) wireless networking protocol such as 802.11, Wi-Fi, Bluetooth, Zigbee, etc. Such a WLAN may also be optionally implemented for the short range second layer wireless communications path using a COTS Wi-Fi data encryption technique such as, for example, Wi-Fi Protected Access ("WPA" and "WPA2"), Wired Equivalent Privacy ("WEP"), etc.

In one embodiment, the second layer wireless communications path may be optionally implemented as a secure communications path that employs, for example, public key or symmetric key encryption (e.g., such as Advanced Encryption Standard "AES", Data Encryption Standard "DES", Blowfish, Twofish, military encryption formats, etc.) other than COTS Wi-Fi data encryption protocols described above. When a secured communications path is employed for the second layer wireless communications path, it may implemented in software that does not rely on controlled hardware. However, any other type of secure data encryption methodology and/or hardware may be optionally employed if desired for the second layer wireless communications path including, for example, encryption types implemented using National Security Agency Type 1, 2 or 3 hardware products and/or algorithms.

In one exemplary embodiment, the non-secure second level communications path may employ a COTS wireless networking protocol, and the user devices may advantageously be standard unmodified COTS WLAN-capable devices such as smart phones, conventional notebook computers, etc. Thus, for example, users may employ a non-secure COTS handheld device such as an Apple iPhone or other type of smart phone within the short range local network area to request and receive imagery or other digital data from a local network server that in turn is receiving the digital data securely from a remote information source such as a UAV. In this way, a multi-layer communications system may be implemented that supports multiple (e.g., thousands) of users each using commercial devices to view end product data that was originally provided in secure format over the first layer communication path by a remote information source.

In another exemplary embodiment, systems and methods may be provided to bridge military and commercial technologies into an information delivery system by leveraging the existing conventional delivery via military frequencies of encrypted data (such as FMV) from a remote information source through a separate conventional military-specific secure communication device onto a separate local wireless server node component, which may then serve the information (e.g., as a local Wi-Fi hotspot) via COTS wireless frequencies to local user devices such as COTS computer or handheld devices. Such a local Wi-Fi hotspot may be mobile and have limited range, e.g., mounted on a vehicle so that only those local user devices in the immediate vicinity of the hotspot have access to the data. In this exemplary embodiment, a single conventional military-specific device may be employed to make data securely transmitted from a remote information source available (and viewable) to users in a useable format for multiple smaller and less expensive COTS local user devices, e.g., such as conventional smart phones, via a second layer COTS compatible communication path that does not employ secure data communication encryption technology.

In one respect, disclosed herein is a method for providing digital data from a remote information source. The method may include: providing a local wireless server node; receiving encrypted digital data from a remote information source at a secure communications device or at the local wireless server node, the encrypted digital data being across a secure first layer wireless communications path; using the local wireless server node to decrypt the received digital data, or using a secure communications device to decrypt the received digital data and then provide the decrypted data to the local wireless server node; and providing the decrypted digital data from a local wireless server node to at least one local user device across a second layer wireless communications path that is different from the first layer wireless communications path.

In another respect, disclosed herein is a system for providing digital data from a remote information source. The system may include a remote information source, that itself includes: at least one information generating device, and remote processing and communication circuitry coupled to receive information from the information generating device, the remote processing and communication circuitry being further configured to encrypt the received information to produce encrypted digital data, and to transmit the encrypted digital data across a secure first layer wireless communications path. The system may also include: first communication circuitry configured to receive the encrypted digital data from the remote information source across the secure first layer wireless communications path; decryption circuitry coupled to the first communication circuitry, the decryption circuitry being configured to decrypt the received digital data; and a local wireless server node, the local wireless server node including second communication circuitry coupled to receive the decrypted digital data and to provide the decrypted digital data from the local wireless server node to at least one local user device across a second layer wireless communications path.

In another respect, disclosed is a local wireless server node, including: first layer receiving circuitry configured to receive encrypted digital data from a remote information source at a local wireless server node from across a secure first layer wireless communications path; decryption circuitry coupled to the first layer receiving circuitry, the decryption circuitry being configured to decrypt the received digital data; and second layer receiving and transmitting circuitry configured to provide the decrypted digital data from the local wireless server node to at least one local user device across a second layer wireless communications path.

DESCRIPTION OF ILLUSTRATIVE EMBODIMENTS

Figure 1:
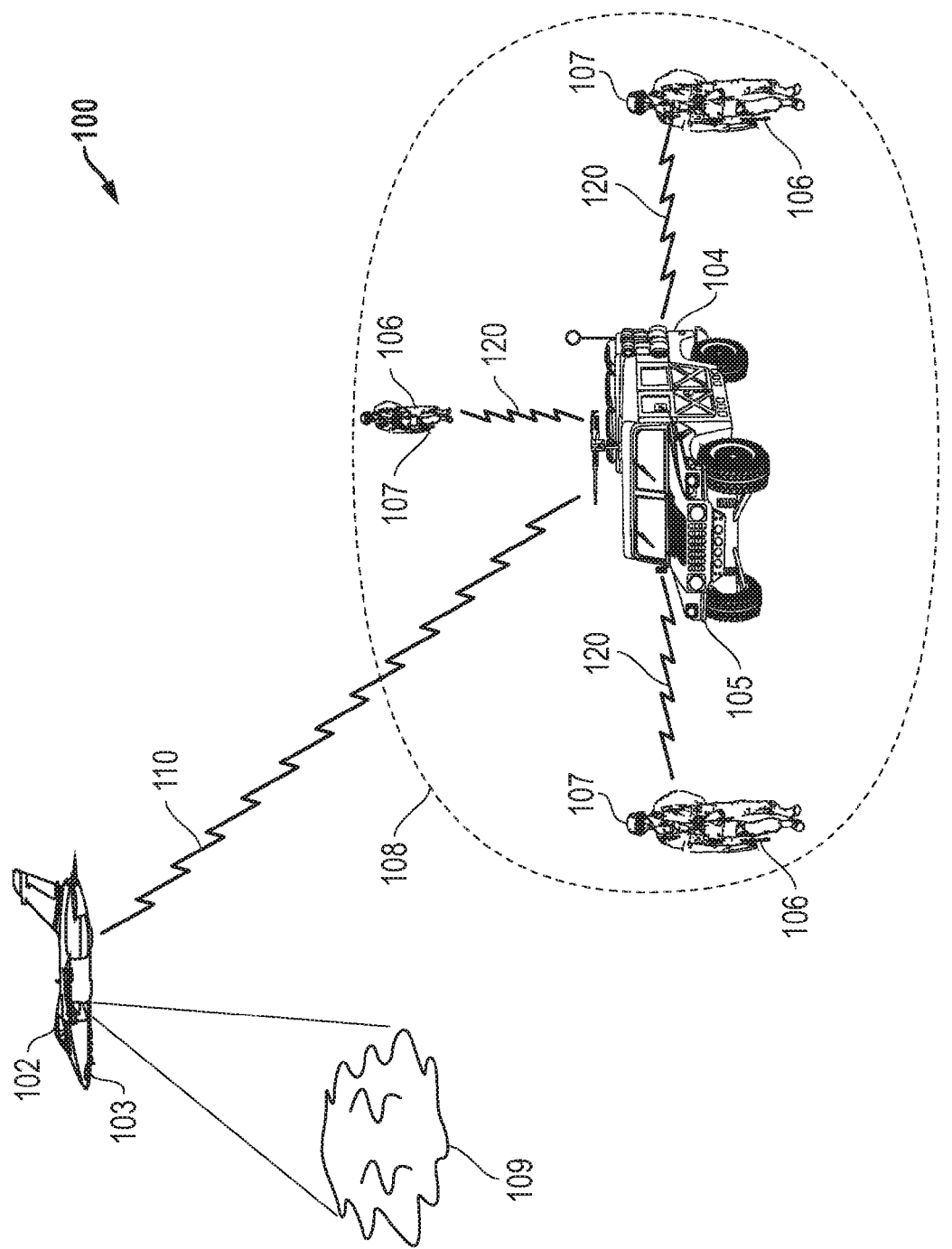
FIG. 1 illustrates an information delivery environment according to one exemplary embodiment of the disclosed systems and methods.

FIG. 1 illustrates one exemplary embodiment of an information delivery environment 100 that includes a remote information source provided in the form of an airborne UAV 103 that is flying over an area of interest. In this embodiment, UAV 103 is a remotely piloted fixed-wing aircraft and may include an onboard video camera for capturing moving video images (e.g., FMV) and/or still images. UAV 103 may also include additional or alternative onboard information generating devices, e.g., thermal or infrared sensors, weather (e.g., temperature, barometric pressure, wind speed, etc.) sensors, radar sensors, acoustic sensors, hyperspectral sensors, etc. It will be understood that UAV 103 is only one example of a mobile remote information source. Other examples of remote information sources include, but are not limited to, other types of aerial vehicles (e.g., manned aerial vehicles, rotary aerial vehicles, balloons, blimps or dirigibles, etc.) as well as ground vehicles, space vehicles or satellites, ships, etc. Moreover, a remote information source may also be non-mobile or stationary, e.g., positioned on an elevated tower, positioned on top of a building, etc.

In the embodiment of FIG. 1, UAV 103 is configured with remote processing and communication circuitry 102 to convert information captured or otherwise gathered by the onboard information generating devices of UAV 103 (e.g., such as sensor data, snapshot image data, streaming or otherwise moving video data, etc.) to digital data for broadcast transmission (along with any associated meta data) via a long range secure first layer wireless communications path 110 to one or more local wireless server nodes 104. For example, long range secure first layer wireless communications path 110 may be a point to point transmission between remote processing and communication circuitry 102 of UAV 103 to a given single local wireless server node 104, or may be a broadcast transmission between remote processing and communication circuitry 102 of UAV 103 to multiple local wireless server nodes 104 and other suitable receiver devices that are spaced apart in different geographic locations. When broadcast to multiple receiver devices secure first layer wireless communications path 110 may be configured to also be backwards compatible with conventional handheld receivers that are currently employed to directly receive data broadcasts from UAVs, such that a single broadcast transmission from remote processing and communication circuitry 102 of UAV 103 may be simultaneously received and understood by both conventional handheld receiver devices and local wireless server nodes 104 configured as described herein. Depending on the nature of the given application, remote processing and communication circuitry 102 may include transmitter circuitry for transmitting to local wireless server node 104 via long range secure first layer wireless communications path 110, or may include transceiver circuitry for bi-directionally communicating with remote processing and communication circuitry 102.

In one embodiment, a secure first layer wireless communications path 110 may be a relatively long range secure wireless data link or protocol on a military-specific frequency such as tactical common data link, common data link, situation awareness data link, satellite communications data link, surveillance and control data link, etc. A relatively long range secure wireless data link may have a maximum line of sight communication range that is greater than one mile in one embodiment, alternatively that is greater than or equal to about five miles in another exemplary embodiment, and further alternatively that is greater or equal to about 10 miles in another exemplary embodiment. In the particular illustrated embodiment of FIG. 1, UAV 103 is shown flying a nearby track and acquiring full motion video of an area of interest 109 below. An area of interest may be, for example, a battle field area, a neighborhood area, a crime scene area, an animal park area, etc. A single frame of the video (snapshot) of the area of interest 109 may be obtained and securely broadcast as digital image data from the aircraft to any/all receivers in the broadcast range reception area, including local wireless server node 104, it being understood that multiple similarly configured local wireless server nodes 104 may be present within broadcast range of remote processing and communication circuitry 102 of UAV 103.

In the embodiment of FIG. 1, a mobile local wireless server node 104 is provided (e.g., mounted) on a mobile ground vehicle 105 (e.g., such as military Humvee or Bradley fighting vehicle, jeep, animal control truck, police or other law enforcement vehicle, etc.) that may optionally provide power for operating local wireless server node 104. However, it will be understood that a local wireless server node 104 may alternatively be stationary mounted or provided in other types of mobile configurations, e.g., mounted on a boat or transported by one or more personnel. Local wireless server node 104 is configured to receive, decrypt, and optionally store the digital data (e.g., sensor or image data with any associated meta data) received from UAV 103 across the secure first layer wireless communications path 110. Examples of types of possible meta data that may be associated with a still or moving image include, but is not limited to, date and/or time the image was captured, distance from current location where image was captured, the assigned priority of an image, etc. Local wireless server node 104 is also configured to transmit decrypted digital data from the UAV across short range second layer communication path 120 to multiple local user devices 106 operated by corresponding local users 107. Short range second layer communication path 120 may be a relatively short range wireless data link having a maximum communication range that is less than or equal to one mile in one embodiment, alternatively that is less than or equal to about one-half mile in another exemplary embodiment, further alternatively that is less than or equal to about 1000 feet in another exemplary embodiment, further alternatively that is less than or equal to about 300 feet in another exemplary embodiment, and further alternatively that is less than or equal to about 100 feet in another exemplary embodiment. Although this embodiment is described in terms of a short range second layer communication path 120, it will be understood that in other embodiments, a second layer communication path may have a longer range.

As shown in FIG. 1, one or more local users 107 (e.g., dismounted ground soldiers or law enforcement officers, animal control personnel, etc.) may be positioned within a local data link bubble 108, which represents the limited communication range of the short range second layer communication path employed by local wireless server node 104. In this exemplary embodiment, normal network communications with local wireless server node 104 are not possible for user devices 106 positioned outside local data link bubble 108, a characteristic which helps provide security against unauthorized access to information contained on local wireless server node 104 by eavesdropping parties. The size of data link bubble 108 may be controlled, for example, by selection of a particular wireless network technology/protocol having the desired communication range for network communications with local wireless server node 104. In one exemplary embodiment a WLAN may be implemented for the short range second layer wireless communications path 120 using a conventional commercial off the shelf (COTS) wireless networking protocol and frequency such as an 802.11 based frequency and protocol (e.g., 802.11 a, b, g, n, etc.), Bluetooth, etc. Besides offering a relatively secure short communication range, such a COTS wireless technology provides the additional advantage that users 106 may utilize COTS user devices (e.g., such as conventional smart phones like the Apple iPhone) to access images and other data from local wireless server node 104, rather than being forced to carry and rely on specialized (e.g., military-specific) user devices. If so desired, conventional 802.11 and Wi-Fi security techniques may be employed for communication across second layer wireless communications path 102, e.g., WEP or WPA security algorithm, requiring a separate user ID and password login for access to local wireless server node 104, etc. Besides short range wireless communication technologies, it will be understood that in other embodiments, a second layer wireless communications path 120 may be implemented using longer range COTS wireless frequencies and protocols, such as WiMAX, etc.

While positioned within local data link bubble 108 of FIG. 1, each of users 107 may at any time use an appropriate user device 107 to establish a network connection over the short range second layer wireless communications path with local wireless server node 104. When a COTS wireless networking protocol is employed, an user 107 located within data link bubble 108 may at any time pull his/her COTS user device 106 out of their pocket, and connect to the local wireless server node 104 mounted on the vehicle 105. Such a COTS user device 106 may be, for example, an unmodified and commercially available handheld smart phone such as Apple iPhone or Android OS-based smart phone, or other type of commercially available WLAN-capable wireless device such as Apple iPad or a netbook computer. Besides using COTS wireless networking protocols, it will be understood that a short range second layer wireless communications path may alternatively be implemented with any other type of suitable wireless networking technology, including proprietary or non-COTS wireless networking protocols that are accessible only with non-COTS user devices.

Upon accessing local wireless server node 104, a user 107 may be optionally allowed in one exemplary embodiment to employ user device 106 to sort and select stored captured image or other types of data using any available meta data that is associated with the different image or other data, such as the date and/or time stored images were captured, the distance from the current location where the stored images were captured, the assigned priorities of the stored images, the geographical coordinates or location corresponding to the image area, etc. In a further exemplary embodiment, the local wireless server node 104 may present a graphical user interface (GUI) to the user via the user device 106 to facilitate image selection and manipulation, and/or a specialized application may be provided (e.g., a Smartphone application) that is loaded onto a user device 106 for facilitating interaction between a user and the local wireless server node 104.

In yet another embodiment, it is possible that a local wireless server node 104 may present other options and functionalities to a user 107 through a user device 106, e.g., by GUI, specialized application, or any other suitable interface. Examples of such functionalities include, but are not limited to, accepting input of information (e.g., messages, requests, commands, instructions, data, etc.) through second layer communication path 120. Such information input from a user 107 may be destined for local wireless server node 104 itself (e.g., as a message, instruction to control server operation, request for delivery or modification of server data, etc.), or may be for uploading from local wireless server node 104 to the remote processing and communication circuitry 102 of the remote information source 103 through the secure first layer wireless communications path 110 (e.g., as a message to personnel operating remote information source 103, as an instruction to control operations of the remote information source 103, etc.). Also possible is transmission of messages or other information between one or more user devices 106 through local wireless server node 104. Thus, in one embodiment, local wireless server node 104 may route all forms of information back and forth between remote processing and communication circuitry 102 of one or more remote information sources and one or more user devices 106 positioned within a local data link bubble 108 surrounding the local wireless server node 104.

Figure 2:
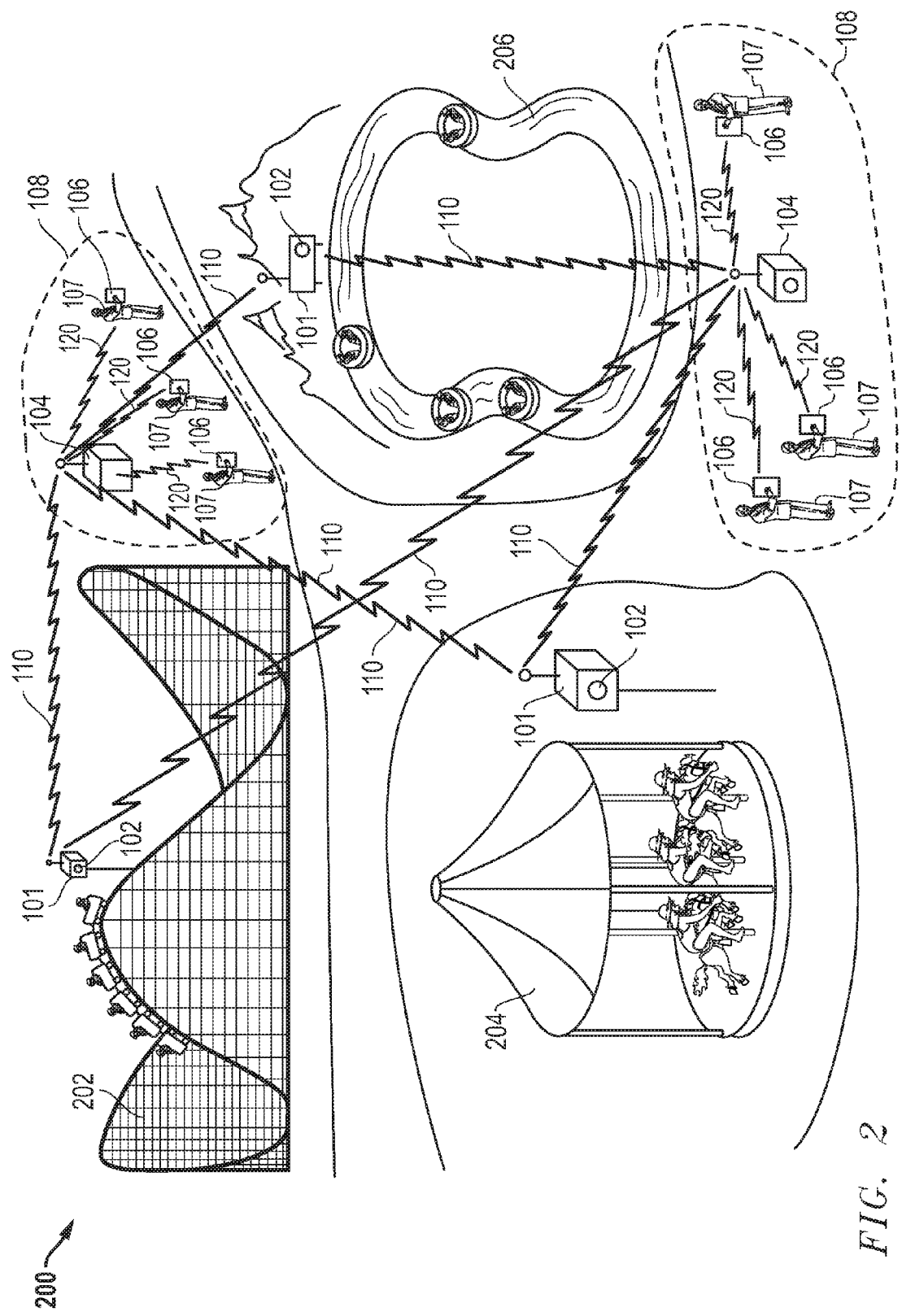
FIG. 2 illustrates an information delivery environment according to one exemplary embodiment of the disclosed systems and methods.

FIG. 2 illustrates an alternate embodiment of an information delivery environment 200 that may be implemented, for example, to capture still or moving images of users (e.g., customers) participating in various activities at an amusement or theme park. It will be understood that a similar system architecture may be employed in other environments, e.g., such as to capture still or moving video images of users who are snow skiing and/or snowboarding in particular activity areas of a ski resort. In the exemplary embodiment of FIG. 2, multiple remote information sources are provided as stationary platforms 101 that each include an information generating device in the form of a camera coupled to remote processing and communication circuitry 102. Each of stationary platforms 101 is positioned adjacent to a corresponding activity area (e.g., attractions such as roller coaster 202, carousel 204, water ride 206) so as to allow its camera to capture images of users while they are using or riding on the corresponding attraction.

In a manner similar to the embodiment of FIG. 1, remote processing and communication circuitry 102 of each remote information source 101 of FIG. 2 is configured to convert information captured by its camera to digital data for broadcast transmission (along with any associated meta data) via a long range secure first layer wireless communications path 110 to each of multiple stationary local wireless server nodes 104 that are positioned at designated activity areas of the amusement park. Each local wireless server node 104 is configured to receive, decrypt, and optionally store the digital image data (e.g., with any associated meta data) received from the remote processing and communication circuitry 102 of each remote information source 101 across the secure first layer wireless communications path 110. Each given local wireless server node 104 is in turn configured to transmit the decrypted digital image data across a short range second layer communication path 120 to multiple local user devices 106 operated by corresponding local users 107 within a corresponding data link bubble 108 of the given local wireless server node 104. These local users 107 may be, for example, amusement park users on foot and walking the amusement park grounds.

As is the case with the embodiment of FIG. 1, each short range second layer wireless communications path 120 may be implemented in one embodiment using a COTS wireless networking protocol such as 802.11abgn to allow users 106 to utilize COTS user devices (such as handheld smartphones) to access captured images and other data from the local wireless server nodes 104. This is particularly convenient for amusement or theme park users 107, who may simply walk to a position within a local data link bubble 108 surrounding one of the local wireless server nodes 104 (e.g., designated by signs) and access an image database on the local wireless server node 104 using their own personal unmodified WLAN-enabled Smartphone or other COTS wireless device 106. A wireless interface (e.g., GUI) may be presented to the customers 107 by the local wireless server node 104 that allows the users to search and browse meta data in the image database to identify and preview one or more images of themselves or friends, e.g., based on posted camera platform identifier number, geographic search based on camera platform location, etc. The wireless interface may also allow a user 107 to then select, purchase and download one or more images if so desired from the local wireless server 104 for a small fee (e.g., via input credit card number).

Figure 3A:
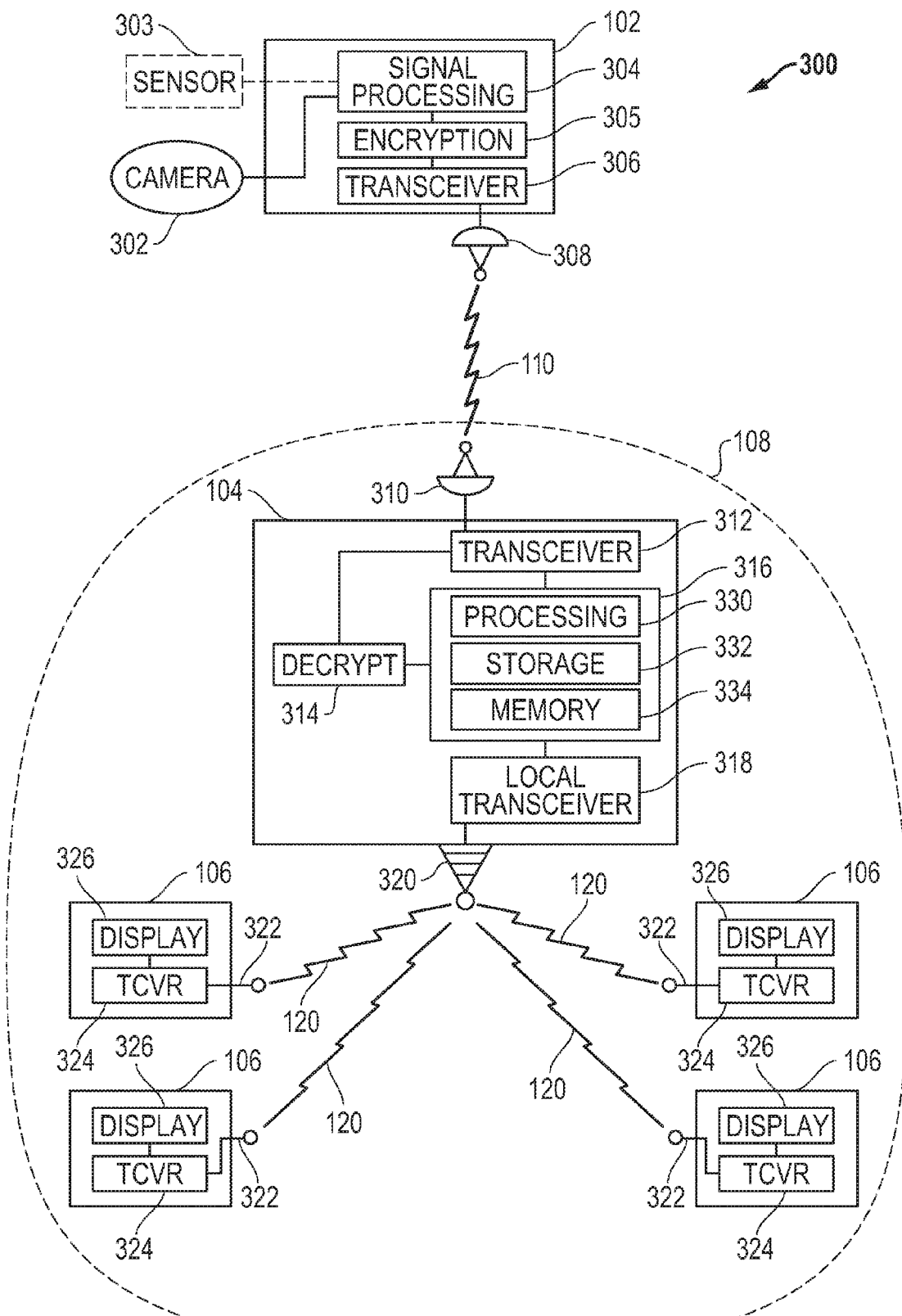
FIG. 3A illustrates a simplified block diagram of an information delivery environment according to one exemplary embodiment of the disclosed systems and methods.

FIG. 3A illustrates a simplified block diagram of remote processing and communication circuitry 102 of a remote information source as they may be operably positioned in one exemplary embodiment relative to a local wireless server node 104 and multiple local user devices 106 in an information delivery environment 300. Information delivery environment may correspond to information delivery environment 100 of FIG. 1, information delivery environment 200 of FIG. 2, or any other information delivery environment that employs a remote information source to generate and transmit information to one or more local wireless server nodes that in turn wirelessly serve the generated information to one or more local user devices. In such an environment, each of remote processing and communication circuitry 102, local wireless network server node 104 and user device/s 106 operate together as respective nodes of a wireless network that may be implemented with one or more network capabilities as described further herein.

As shown in FIG. 3A, remote processing and communication circuitry 102 may include signal processing circuitry 304 and encryption circuitry 305 coupled to receive image data and from an image generating source 302 (e.g., digital CMOS or CCD, visible spectrum or infrared camera) and/or one or more sensor devices 303 (e.g., temperature sensor, barometric pressure sensor, wind speed sensor, acoustic sensor, etc.). Signal processing circuitry 304 and encryption circuitry 305 may include, for example, one or more processing, storage and/or memory devices that are configured to receive raw image and/or sensor data captured by sources 302, 303 and to convert this captured raw data to a desired or otherwise specified encrypted data format suitable for transmission by transmitting circuitry of transceiver 306 to local wireless server node 104 via long range secure first layer wireless communications path 110. Examples of image data processing tasks that may be performed by signal processing circuitry 304 include, but are not limited to, frame grabbing and compression to create MPEG-2 moving image data, JPEG still image data, Adobe Flash video streaming data, etc. It will be understood that transmit-only circuitry may be alternatively provided as transmitting circuitry of remote processing and communication circuitry 102 (e.g., instead of receiving and transmitting circuitry of transceiver circuitry 306) where two-way communication back from local wireless server node 104 is not employed.

Encryption circuitry 305 of remote processing and communication circuitry 102 may also be configured to encrypt the processed data to a secure data format for transmission, e.g., a format such as AES, DES, Blowfish, Twofish, military encryption formats, etc. A digital signal processor (DSP) may be provided to perform one or more of the above tasks for either or both of signal processing circuitry 304 and/or encryption circuitry 305. Transceiver circuitry 306 may include any radio frequency (RF) transmission and receiving circuitry suitable for providing a RF transmit signal to antenna 308 for secure first layer wireless communications path 110 and for receiving a RF signal from antenna 308 across secure first layer wireless communications path 110, e.g., to enable two-way communication between remote processing and communication circuitry 102 and one or more local wireless server nodes 104 and/or other local receiver and/or transmitter devices across secure first layer wireless communications path 110. It will be understood that remote processing and communication circuitry 102 may optionally employ transmit-only circuitry where two-communication is not desired or required, and/or may be provided with separate receiver and transmit circuitry to perform the functions of transceiver circuitry 306.

Still referring to FIG. 3A, local wireless server node 104 of this embodiment is configured as an integrated solution that not only includes server circuitry, but also includes circuitry for communicating over both secure first layer wireless communications path 110 and second layer communications path 120. In such an integrated solution, local wireless server node 104 may include an antenna 310 configured to receive the RF signal of long range secure first layer wireless communications path 110 as transmitted by remote processing and communication circuitry 102 of a remote information source. Antenna 310 is coupled as shown to provide this received signal to receiving circuitry of transceiver circuitry 312 and decryption circuitry 314 which may be implemented separately or together, and which may include a DSP or any other configuration of one or more processing devices configured to extract the decrypted transmitted information (e.g., image and/or sensor data) from the RF signal received from across long range secure first layer wireless communications path 110. It will be understood that receive-only circuitry may be alternatively be provided as receiving circuitry for local wireless server node 104 (e.g., instead of receiving and transmitting circuitry of transceiver circuitry 312) where two-way communication back to information source 102 is not employed.

Server circuitry 316 may be coupled as shown to receive the decrypted data from decryption circuitry 314, and may include one or more processing 330, storage 332, and/or memory devices 334 that are configured to receive and manage (e.g., store, process, route, and/or manipulate) the decrypted image, sensor, or other data. For example, FMV or other digital data may be transcoded from one format to another (e.g., from DVI to H.264, or from MPEG2 to MPEG4) as required to support COTS local user devices 106.

To communicate with local user devices 106, wireless server node 104 may be configured as shown with local WLAN transceiver circuitry 318 that is configured to bi-directionally communicate with local user devices 106 using WLAN RF signals transmitted and received via an antenna 320 across second layer wireless communications path 120. The RF signals of second layer wireless communications path 120 may be, for example, 2.4 GHz, 3.6 GHz or 5 GHz network communications signals transmitted and received using 802.11 protocol or any other suitable combination of WLAN frequency and protocol. In this regard, local transceiver circuitry 318 may be implemented using any radio frequency (RF) receive and transmit circuitry suitable for providing a RF transmit signal to antenna 320 for second layer wireless communications path 120, and for receiving a signal via antenna 320 from one or more local user devices 106. It will be understood that image, sensor, or other received data may alternatively be stored in encrypted form on server circuitry 316 and only decrypted when transmitted across second layer wireless communications path 120.

As further shown in FIG. 3A, each of local user devices 106 in this exemplary embodiment includes an antenna 322 coupled to transceiver circuitry 324, and a display 326 for displaying the images and/or any other information (e.g., directly and/or using a browser) received across second layer wireless communications path 120. User input circuitry may also be provided (e.g., display 326 may be configured as a touchscreen or separate keyboard circuitry may be provided) to allow a local user to send requests and other network commands to local wireless server node 104. It will be understood that each local user device 106 may include any suitable processing device or combination of processing devices and/or other circuitry that is suitable for accepting network request inputs from local users 107 and forwarding them to local wireless server node 104 across second layer wireless communications path 120 via transceiver circuitry 324 and antenna 322, and for receiving network communications and data (e.g., including captured sensor and image data from local wireless network server node 104) via antenna 322 and transceiver circuitry 324.

In one exemplary embodiment, server circuitry 316 may also be configured to interface with and respond to requests for retrieval of information received from local user devices 106 across second layer wireless communications path 120. Processing devices 330 within server circuitry 316 may also be optionally configured to process information received from remote processing and communication circuitry 102 of one or more remote information sources (e.g., to perform image manipulation such as enlargement, cropping, reduction or color enhancement; perform sound analysis such as noise removal or isolation of particular waveforms; to perform image clarification or visual noise removal from an image; to perform facial and/or object recognition within image data; to perform pattern recognition of sounds or images; etc.). In this regard, one or more processing devices 330 within server circuitry 316 may be so configured to process information received from remote processing and communication circuitry 102 either autonomously and/or in response to a request received from remote processing and communication circuitry 102 and/or from one or more local user devices 106 across a bidirectional across second layer wireless communications path 120. For security or other purposes, server circuitry 316 may also be configured to selectively communicate or not communicate information to local user devices 106, e.g., in response to a local command via input/output device (e.g., keyboard or touchscreen) of local wireless server node 104, or in response to remote command received, for example, from remote processing and communication circuitry 102 across first layer wireless communications path 110.

A local wireless server node 104 may also be configured to optionally route information between other nodes of the wireless network established by local wireless server node 104. In such an embodiment, circuitry components of local wireless server node 104 may be configured to route information between local user devices across second layer wireless communications path 120, and/or to route information between local user devices 104 and remote processing and communication circuitry 102 of a remote information source across first layer wireless communications path 110. In either case, information may be routed, for example, at the direction of (and/or to an address specified by) a local user 107, and/or by command sent from remote processing and communication circuitry 102 of a remote information source. Such routed information may include, for example, text or voice messages, or images or other information (e.g., attached to a message sent between specified nodes of the wireless network). In one embodiment, local wireless server node 104 may be configured to simultaneously broadcast common information to any two or more multiple nodes (or all other nodes) of the wireless network from any given other node of the wireless network. Thus, one or more processing devices 330 within server circuitry 316 may be configured to process any type of information (e.g., by storing, retrieving, processing, routing, manipulating, etc.) that is available to local wireless server node 104, and in response to a command or request received from any coupled source, including from remote processing and communication circuitry 102 and/or from one or more local user devices 106.

Figure 3B:
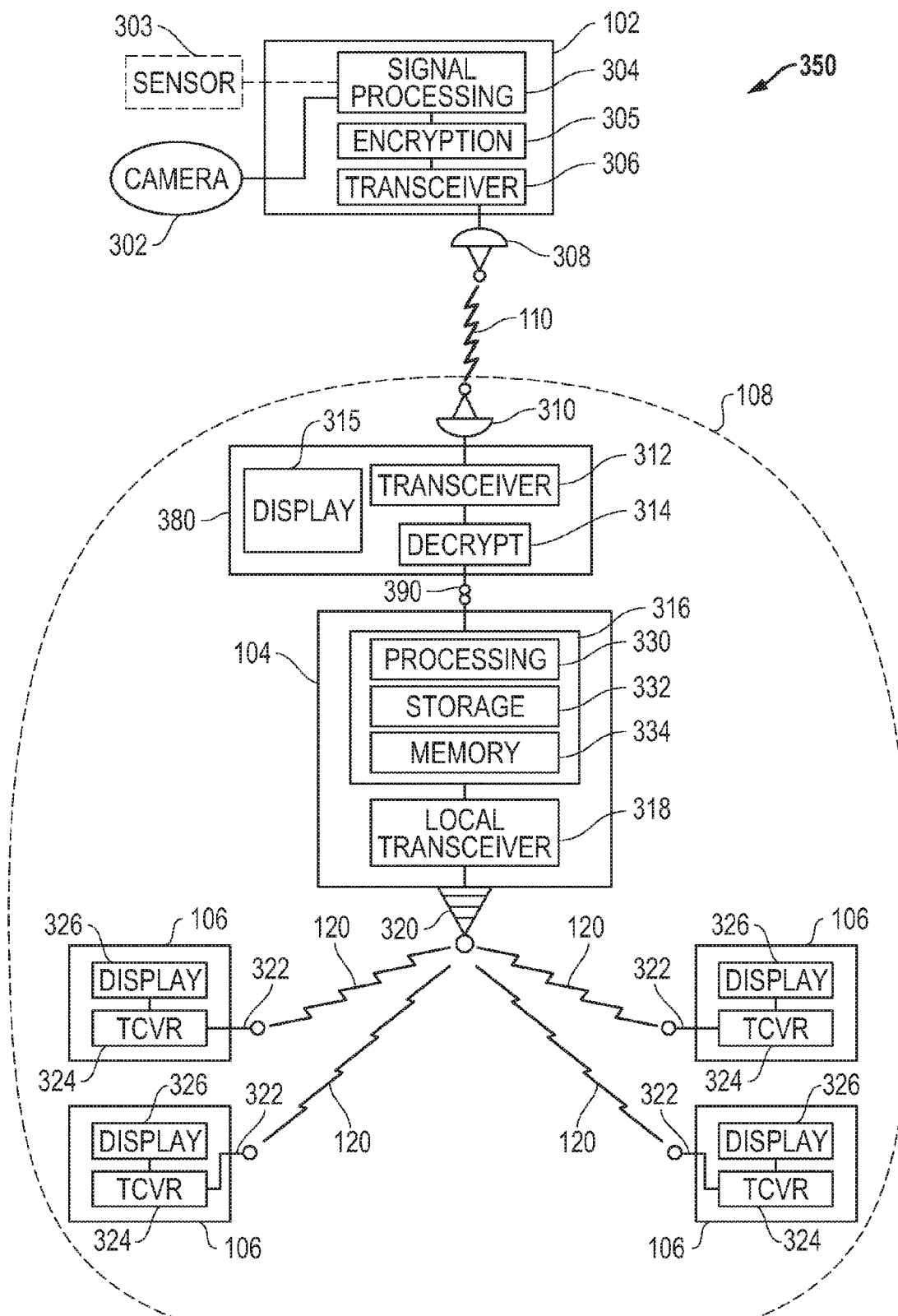
FIG. 3B illustrates a simplified block diagram of an information delivery environment according to one exemplary embodiment of the disclosed systems and methods.

FIG. 3B illustrates a simplified block diagram of an alternative embodiment in which a local wireless server node 104 is provided as a separate component that may be communicatively coupled to a separate stand-alone secure communications device 380 that is configured to handle the communications with remote processing and communication circuitry 102 across secure first layer wireless communications path 110. Examples of such a separate secure communications device 380 include, but are not limited to, a military-specific secure communication device such as a Rover series receiver or transceiver device available from L-3 Communications of New York, N.Y., laptop, or other device that is suitably configured (e.g., with one or more processing devices) to decrypt information contained in the RF signal of secure first layer wireless communications path 110 so as to extract the decrypted transmitted information (e.g., image and/or sensor data) from the RF signal received from across long range secure first layer wireless communications path 110. As shown, separate secure communications device 380 of this embodiment includes antenna 310, transceiver circuitry 312, and decryption circuitry 314 that may function in a manner similar to the same components described for the integrated embodiment of FIG. 3A. Secure communications device 380 may also include an integral display screen 315 and input/output capability (e.g., via keyboard or touchscreen) that is not shown. In this embodiment, secure communications device 380 is coupled and configured to provide decrypted image, sensor, or other data to a separate non-integrated local wireless server node 104 via coupled communication path 390 which may be, for example, a fiber optic connection.

Still referring to FIG. 3B, non-integrated local wireless server node 104 of this embodiment includes one or more processing 330, storage 332, and/or memory devices 334 that are configured to receive and manage decrypted image, sensor, or other data in the same manner described for like components in the integrated solution of FIG. 3A. Non-integrated local wireless server node 104 also includes local WLAN transceiver circuitry 318 that is configured to bi-directionally communicate with local user devices 106 using WLAN RF signals transmitted and received via an antenna 320 across second layer wireless communications path 120 in a manner as previously described. Otherwise, the same capabilities and functions described for the integrated local wireless server node embodiment of FIG. 3A may be implemented by the combination of an existing communications device 380 and a non-integrated local wireless server node 104 of FIG. 3B. Thus, remote processing and communication circuitry 102 and secure communications device 380 may be components of a pre-existing system, to which local wireless server node 104 may be coupled to implement the disclosed systems and methods with conventional (e.g., COTS) local user devices 106, for example, to allow delivery of digital data from a remote information source 103 through a military-specific device such as a L-3 Rover device onto a local wireless server node 104, which then serves the information to local commercial user devices 106.

It will be understood that the particular illustrated embodiments of FIGS. 3A and 3B are exemplary only, and that any other combination of one or more remote information sources may be employed that each include remote processing and communication circuitry of any configuration that is suitable for communicating information via a relatively long range secure first layer wireless communications path to one or more local wireless server nodes that are each in turn configured in any manner suitable for establishing a wireless network with one or more local user devices over which captured or otherwise gathered information originating from the remote information source may be processed and/or served to the local user devices over a short range (and optionally unsecure) second layer communication path 120.

It will be understood that one or more of the tasks, functions, or methodologies described herein (e.g., including tasks performed by processing devices of remote processing and communication circuitry 102, local wireless server node 104,) may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method for providing digital data from a remote information source, comprising:
providing a local wireless server node;
receiving encrypted digital data from a remote information source at a secure communications device or at the local wireless server node, the encrypted digital data being across a secure first layer wireless communications path, the secure first layer wireless communications path being a wireless transmission path from the remote information source to the local wireless server node;
using the local wireless server node to decrypt the received digital data, or using a secure communications device to decrypt the received digital data and then provide the decrypted data to the local wireless server node; and
providing the decrypted digital data from a local wireless server node to at least one local user device across a second layer wireless communications path that is different from the first layer wireless communications path, the second layer wireless communications path being a wireless transmission path from the local wireless server node to the local user device.

2. The method of claim 1, where the digital data comprises information gathered by the remote information source that includes at least one of sensor data, still or moving image data, or a combination thereof.

3. The method of claim 1, further comprising:
providing a stand-alone secure communications device that is separate and non-integrated with the local wireless server node, the secure communications device being coupled by a communications path to exchange data with the local wireless server node;
using the secure communications device to receive the encrypted digital data from the remote information source from across the secure first layer wireless communications path;
using the secure communications device to decrypt the received digital data;
providing the decrypted digital data from the secure communications device to the local wireless server node; and then
providing the decrypted digital data from the local wireless server node to at least one local user device across a second layer wireless communications path that is different from the first layer wireless communications path.

4. The method of claim 3, where the local user device comprises an unmodified commercial off the shelf (COTS) handheld device.

5. The method of claim 1, further comprising providing the local wireless server node on a mobile vehicle; and performing the following steps while operating the local wireless server node on the mobile vehicle:
receiving the encrypted digital data on the mobile vehicle at the local wireless server node or at a secure communications device provided on the mobile vehicle, the encrypted digital data being received from the remote information source and from across the secure first layer wireless communications path;
using the local wireless server node to decrypt the received digital data on the mobile vehicle, or using a secure communications device the local wireless server node to decrypt the received digital data on the mobile vehicle and provide the decrypted digital data to the local wireless server node; and
providing the decrypted digital data from the local wireless server node to at least one local user device across a second layer wireless communications path.

6. The method of claim 5, further comprising:
providing the remote information source as an airborne aerial vehicle;
transmitting encrypted digital data from the airborne remote information source across the secure first layer wireless communications path to the local wireless server node on the mobile vehicle or to a secure communications device provided on the mobile vehicle, the encrypted digital data comprising an image of the ground taken from the airborne aerial vehicle; and
providing the decrypted digital data from the local wireless server node to multiple local user devices across the second layer wireless communications path, each of the multiple local user devices being operated by a dismounted human operator.

7. The method of claim 1, further comprising:
providing the remote information source in a position adjacent a user activity area, the remote information source including a camera configured to capture images of users present in the user activity area;

using the camera to capture digital image data of users while present in the user activity area;

encrypting the captured digital image data at the remote information source prior to transmitting the encrypted digital image data from the remote information source across the secure first layer wireless communications path to the local wireless server node on the mobile vehicle or to a secure communications device provided on the mobile vehicle;

using the local wireless server node to decrypt the received digital data, or using a secure communications device to decrypt the received digital data and to provide the decrypted digital date to the local wireless server node;

providing the local wireless server node in a position accessible to users who are operating local wireless user devices; and providing the decrypted digital image data from the local wireless server node across the second layer wireless communications path to the local user devices operated by the users.

8. The method of claim 1, where the local user device comprises a commercial off the shelf (COTS) handheld device.

9. The method of claim 1, where the wireless communication range of the second layer wireless communications path is shorter than the wireless communication range of the first layer communication path; where the outer wireless communication range of the second layer wireless communications path defines a limited data link bubble around the local wireless server node such that the first layer communication path is transmitted from the remote information source to areas beyond and outside the data link bubble defined by the second layer wireless communications path; and where the method further comprises providing the decrypted digital data across the second layer wireless communications path from the local wireless server node only to local user devices that are positioned within the limited data link bubble defined around the local wireless server node.

10. The method of claim 1, where the secure first layer wireless communications path comprises a tactical common data link; and where the second layer wireless communications path is implemented with an 802.11 based protocol and frequency.

11. The method of claim 1, where the secure first layer wireless communications path comprises is implemented with at least one NSA Type 1 hardware product; and where the second layer wireless communications path is implemented with an 802.11 based protocol and frequency.

12. The method of claim 1, where the secure first layer wireless communications path is implemented using algorithm and/or hardware encryption technology that does not utilize commercial off the shelf (COTS) technology to implement and that is not decryptable using COTS data encryption techniques and/or COTS communication equipment that employs COTS data encryption techniques; and where the second layer wireless communication path is implemented using COTS wireless networking protocol and frequency.

13. The method of claim 1, further comprising using the local wireless server node to respond to at least one of requests or commands transmitted across the second layer wireless communications path from the at least one local user device.

14. The method of claim 1, further comprising using the local wireless server node to at least one of store, process or manipulate information received from the remote information source prior to providing the decrypted digital data from the local wireless server node to at least one local user device across a second layer wireless communications path.

15. The method of claim 1, further comprising using the local wireless server node to establish a wireless network that includes the remote information source, the local wireless server node, and multiple local user devices; and where the method further comprising using the local wireless server node to route information to and from each node of the wireless network to each other node of the wireless network established by the local wireless server node.

16. A system for providing digital data from a remote information source, comprising:
a remote information source, the remote information source comprising:
at least one information generating device, and
remote processing and communication circuitry coupled to receive information from the information generating device, the remote processing and communication circuitry being further configured to encrypt the received information to produce encrypted digital data, and to transmit the encrypted digital data across a secure first layer wireless communications path, the secure first layer wireless communications path being a wireless transmission path from the remote information source to the local wireless server node;
first communication circuitry configured to receive the encrypted digital data from the remote information source across the secure first layer wireless communications path;
decryption circuitry coupled to the first communication circuitry, the decryption circuitry being configured to decrypt the received digital data; and
a local wireless server node, the local wireless server node comprising second communication circuitry coupled to receive the decrypted digital data and to provide the decrypted digital data from the local wireless server node to at least one local user device across a second layer wireless communications path, the second layer wireless communication path being a wireless transmission path from the local wireless server node to the local user device.

17. The system of claim 16, where the information generating device comprises at least one of a digital camera, a sensor, or a combination thereof.

18. The system of claim 16, further comprising:
a stand-alone secure communications device that is separate and non-integrated with the local wireless server node, the secure communications device being coupled by a communications path to exchange data with the local wireless server node;
where the secure communications device comprises the first communication circuitry and the decryption circuitry; and
where the secure communications device is coupled to provide the decrypted digital data from the decryption circuitry to the local wireless server node.

19. The system of claim 18, where the local user device comprises an unmodified commercial off the shelf (COTS) handheld device.

20. The system of claim 16, further comprising a mobile vehicle, the local wireless server node being positioned on the mobile vehicle.

21. The system of claim 20, where the remote information source comprises an aerial vehicle.

22. The system of claim 16, further comprising the at least one local user device, the at least one user device comprising multiple local user devices.

23. The system of claim 16, further comprising the at least one local user device, the at least one user device comprising a commercial off the shelf (COTS) handheld device.

24. The system of claim 16, where the wireless communication range of the second layer wireless communications path is shorter than the wireless communication range of the first layer communication path; where the outer wireless communication range of the second layer wireless communications path defines a limited data link bubble around the local wireless server node such that the first layer communication path is transmitted from the remote information source to areas beyond and outside the data link bubble defined by the second layer wireless communications path.

25. The system of claim 16, where the secure first layer wireless communications path comprises a tactical common data link; and where the second layer wireless communications path is implemented with an 802.11 based protocol and frequency.

26. The system of claim 16, where the secure first layer wireless communications path comprises is implemented with at least one NSA Type 1 hardware product; and where the second layer wireless communications path is implemented with an 802.11 based protocol and frequency.

27. The system of claim 16, where the secure first layer wireless communications path is implemented using algorithm and/or hardware encryption technology that does not utilize commercial off the shelf (COTS) technology to implement and that is not decryptable using COTS data encryption techniques and/or COTS communication equipment that employs COTS data encryption techniques; and where the second layer wireless communication path is implemented using COTS wireless networking protocol and frequency.

28. The system of claim 16, where the second communication circuitry is configured to receive digital data across the second layer wireless communications path from at least one local user device across the second layer wireless communications path; and where the local wireless server node further comprises server circuitry configured to respond to at least one of requests or commands transmitted across the second layer wireless communications path from the at least one local user device.

29. The system of claim 16, where the local wireless server node further comprises server circuitry configured to at least one of store, process or manipulate information received from the remote information source prior to providing the decrypted digital data from the local wireless server node to at least one local user device across the second layer wireless communications path.

30. The system of claim 16, where the local wireless server node is configured to establish a wireless network that includes the remote information source, the local wireless server node, and multiple local user devices; and where the local wireless server node is configured to route information to and from each node of the wireless network to each other node of the wireless network established by the local wireless server node.

31. A local wireless server node, comprising:
first layer receiving circuitry configured to receive encrypted digital data from a remote information source at a local wireless server node from across a secure first layer wireless communications path, the secure first layer wireless communications path being a wireless transmission path from the remote information source to the local wireless server node;
decryption circuitry coupled to the first layer receiving circuitry, the decryption circuitry being configured to decrypt the received digital data; and
second layer receiving and transmitting circuitry configured to provide the decrypted digital data from the local wireless server node to at least one local user device across a second layer wireless communications path, the second layer wireless communications path being a wireless transmission path from the local wireless server node to the local user device.

32. The local wireless server node of claim 31, where the secure first layer wireless communications path comprises a tactical common data link; and where the second layer wireless communications path is implemented with an 802.11 based protocol and frequency.

33. The local wireless server node of claim 31, where the secure first layer wireless communications path comprises is implemented with at least one NSA Type 1 hardware product; and where the second layer wireless communications path is implemented with an 802.11 based protocol and frequency.

34. The local wireless server node of claim 31, where the secure first layer wireless communications path is implemented using algorithm and/or hardware encryption technology that does not utilize commercial off the shelf (COTS) technology to implement and that is not decryptable using COTS data encryption techniques and/or COTS communication equipment that employs COTS data encryption techniques; and where the second layer wireless communication path is implemented using COTS wireless networking protocol and frequency.

35. The local wireless server node of claim 31, further comprising server circuitry coupled to the decryption circuitry, the server circuitry being configured to at least one of store, process, route or manipulate the decrypted digital data.

36. The local wireless server node of claim 35, where the second layer receiving and transmitting circuitry is configured to receive data communication in the form of at least one of commands or requests transmitted across the second layer wireless communications path from at least one local user device; and where the server circuitry is configured to respond to at least one of requests or commands transmitted across the second layer wireless communications path from at least one local user device by at least one of retrieving, storing, processing, routing or manipulating digital data.

37. The local wireless server node of claim 35, where the server circuitry is configured to process information received from the remote information source prior to providing the decrypted digital data from the local wireless server node to at least one local user device across a second layer wireless communications path.

38. The local wireless server node of claim 35, where the server circuitry is configured to establish a wireless network that includes the remote information source, the local wireless server node, and multiple local user devices; and where the server circuitry is configured to use the local wireless server node to route information to and from each node of the wireless network to each other node of the wireless network established by the local wireless server node.

* * * * *